Oct. 1, 1935.  W. H. DELAHAYE  2,015,713
AUTOMOBILE BRAKE
Filed Dec. 2, 1929

INVENTOR:
WALTER H. DELAHAYE.

BY  ATTORNEY

Patented Oct. 1, 1935

2,015,713

UNITED STATES PATENT OFFICE 2,015,713

AUTOMOBILE BRAKE

Walter H. Delahaye, Ottawa, Ontario, Canada, assignor to Bendix Brake Company, South Bend, Ind.

Application December 2, 1929, Serial No. 410,934

10 Claims.  (Cl. 188—78)

The object of this invention is to provide an automobile brake in which the expansion of the shoes is effected by a plurality of devices, one of which acts in advance of the other but is of the non-reversible type so that no effort is required to hold it in the expanded position while the secondary expanding means is arranged to exert the actual brake-applying force. By having such an arrangement of the applying means it is possible to have a much greater clearance between the shoes and the drum than that commonly used. Thus the necessity for the accurate setting of the shoes in respect to the drum is avoided. In the present type of brake this clearance is so slight that there is some difficulty in maintaining it, even in a new car, but when the parts are worn and the shoes are no longer concentric with the wheel this difficulty is increased. The possibility of setting the shoes with a greater clearance is also an advantage as it reduces risk of freezing when the car is in use in cold, wet weather, which causes considerable trouble and annoyance, especially in the case of enclosed brakes.

Referring now to the accompanying drawing, which illustrates, by way of example, one convenient embodiment of the invention:

Figure 1:
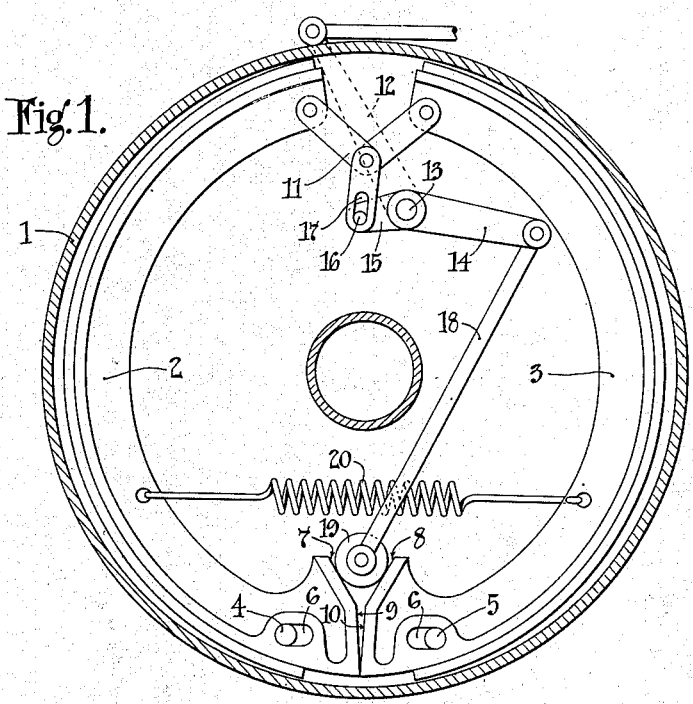
Figure 1 is an elevation of the improved brake in released position.

In the drawing the invention is shown applied to an internal brake having two internal expanding shoes. Within the drum I are mounted a pair of shoes 2 and 3 which are anchored on fixed pivots 4 and 5. The shoes are provided with slots 6 to receive the pivots instead of being pivoted in the usual manner. The reason for this will appear later. The pivoted ends of the shoes are further provided with opposed cam surfaces 7 and 8 which are continued to present surfaces 9 and 10, which are substantially parallel when the shoes are expanded. The free ends of the shoes may be operated by any of the common cam or toggle mechanisms, the latter type being indicated in the drawing at 11. The operating lever for the toggle, shown at 12, is pivoted at 13 and is connected to a lever having a relatively long arm 14 and a relatively short arm 15. The toggle 11 is connected to the arm 15 by a lost motion connection such as a pin 16 and slot 17. From the free end of the arm 14 a link 18 depends and carries at its extremity a roller 19 which rides between the opposed cams 7 and 8 and surfaces 9 and 10 of the shoes. This roller 19 is held constantly in contact with the shoes by a spring 20 stretched between them. This spring also holds the shoes with the outer ends of the slots against the fixed pivots when the brake is in the off position.

Figure 2:
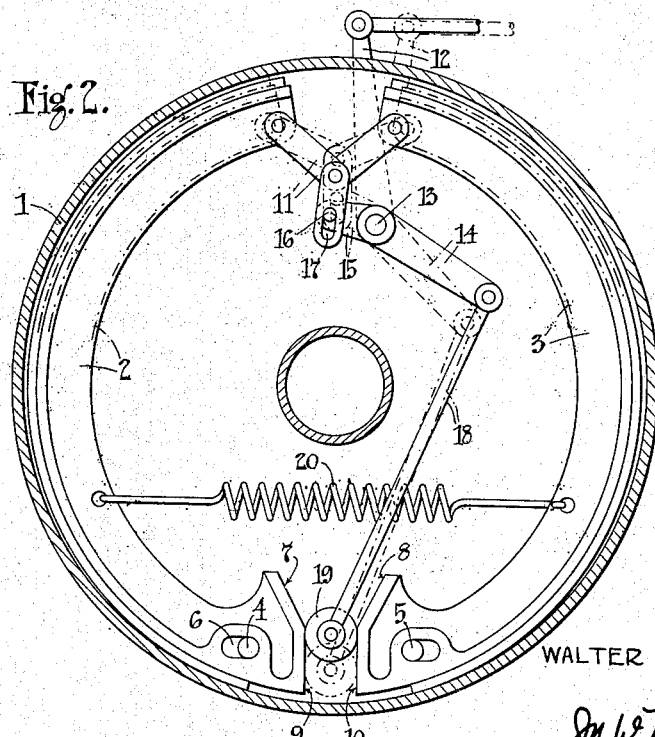
Figure 2 is a similar elevation showing in full lines the position of the parts when one expanding device has operated, and in dotted lines when both devices have operated.

The operation of the device will be apparent but will be briefly described. When the brake is applied by movement of the lever 12, the lever 14—15 moves in a clockwise direction and the first part of the movement will press the roller 19 from the abrupt cam surfaces 7 and 8 to a position between the parallel surfaces 9 and 10. The roller 19 thus moves from the position shown in Figure 1 to that shown in full lines in Figure 2. This movement brings the shoes into close relationship with the drum 1, but does not actually apply the brake. It will be seen that any further travel of the roller 19 does not affect the position of the shoes and consequently the lever 14—15 is free to continue the movement required to operate the toggle which develops the pressure necessary to apply the shoes to the drum.

From the above description of the illustrated example of the invention it will be seen that the requirements of the invention are essentially a pair of expanding mechanisms operated from a common lever or the like, one mechanism being so formed and of such a leverage that it imparts to the shoes a rapid initial expansion during the commencement of the brake application and maintains such expansion without any reaction on the applying means, while it completes its movement in applying the brake through leverage developed by the other expansion mechanism.

Many modifications may be made without departing from the scope of the invention as defined in the appended claims.

For purposes of illustration the drawing is to some extent diagrammatic, the levers having greater movements than are necessary in practice.

What I claim is:

1. In a brake, in combination with a fixed support and a rotating drum, a pair of shoes pivoted to the support at their ends by pin and slot connections, means between the ends to initially expand the shoes by causing the slots to travel on the pivots and means to expand the separable ends of the shoes operable after the initial expansion.

2. A brake having the features set forth in claim 1, wherein cams are provided on the pivoted ends of the shoes, and cam-engaging means operating between said ends.

3. A brake having the features set forth in claim 1, wherein said shoes are provided at their pivoted ends with opposed surfaces having abrupt cam portions and substantially parallel portions, in combination with a lever-operated expanding means to engage said cams and means to expand the free ends of the shoes.

4. In combination with the brake having the features set forth in claim 1, an operating lever pivoted to the said support near the free ends of said brakes, a link connecting an arm of said lever to the means for expanding the free ends of the shoes, and a roll supporting link connected to said arm at a point more remote from the fulcrum of the lever than the first mentioned link, said roll lying between the pivoted ends of the shoes and being adapted to engage cam surfaces thereon.

5. In a brake, and in combination with the fixed support and the drum therefor, a pair of fixed pivots on the support, a pair of shoes having slots in their ends to engage said pivots, means engaging the ends of said shoes to cause initial movement thereof along the lines of said slots, and means operable only after the initial movement to expand the separable ends of said shoes.

6. In a brake as set forth in claim 5, a lever connected to the means for expanding the separable ends of the shoes and to the means for expanding the other ends thereof.

7. In a brake as set forth in claim 5, a lever connected to the means for expanding the separable ends of the shoes and to the means for expanding the other ends thereof, said last mentioned means acting during the full movement of the lever to first expand the said other ends and thereafter to maintain them so expanded without causing any force reaction on said lever as it completes the full movement required to expand the separable ends of the shoes.

8. A brake comprising a pair of floating shoes, a pair of successively actuated applying devices engaging and floating with the shoes, and means separate from said devices for taking the braking torque directly from the shoes.

9. A brake comprising a pair of floating shoes, a pair of applying devices engaging and floating with the shoes, and means separate from said devices for taking the braking torque of both shoes directly from one or the other of the shoes.

10. A brake comprising a pair of floating shoes, a pair of applying devices across the brake from each other engaging and floating with the shoes, and means separate from said devices for taking the braking torque directly from the shoes, at least one of the applying devices including means having a relatively rapid first stage of operation, to take up the clearance of the shoes, and being thereafter relatively ineffective in the final application of the brake.

WALTER H. DELAHAYE.